May 24, 1938.　　　　M. S. LOWER　　　　2,118,677
DOLL CONSTRUCTION
Filed April 28, 1937
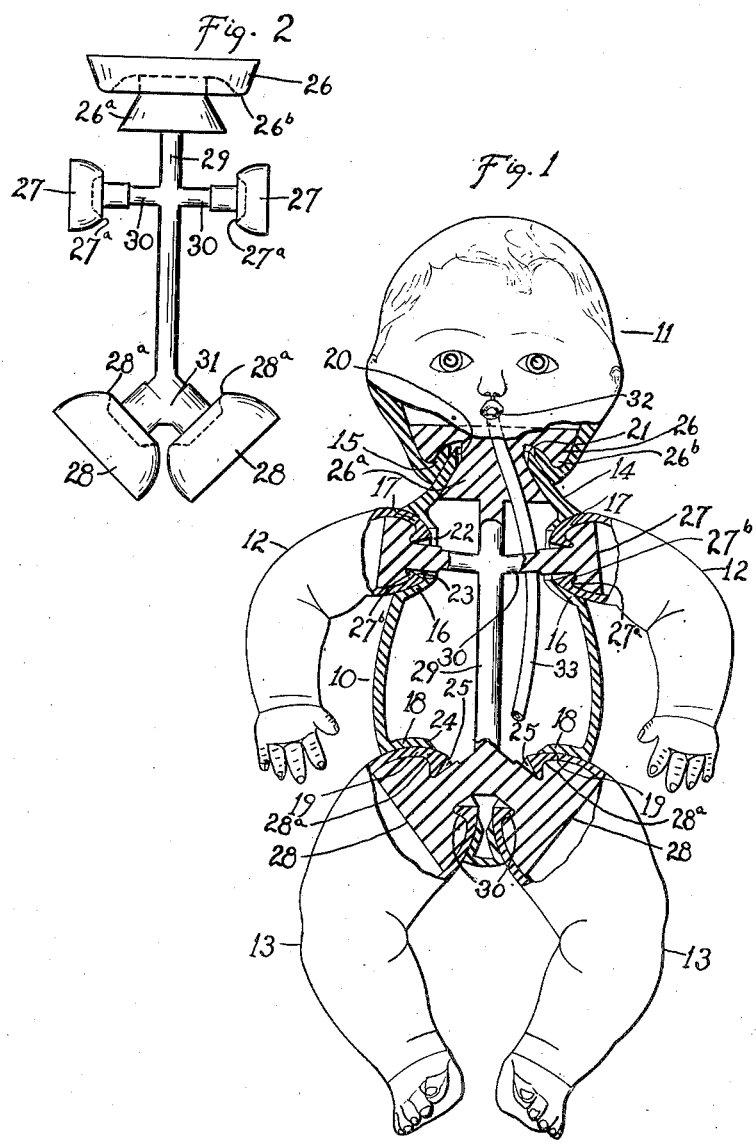
Inventor
MELVIN S. LOWER
By Ralph Barrow,
Attorney Patented May 24, 1938

2,118,677

UNITED STATES PATENT OFFICE 2,118,677

DOLL CONSTRUCTION

Melvin S. Lower, Wadsworth, Ohio, assignor to The Sun Rubber Company, Barberton, Ohio, a corporation of Ohio Application April 28, 1937, Serial No. 139,545

1 Claim. (Cl. 46—161)

This invention relates to doll constructions and particularly to sectional dolls of the type in which separate torso, limb and head members are provided and so connected as to have articulating joints.

Heretofore, dolls of this type have been constructed of parts of rubber or other material in which joint members have been placed with hook means projecting into the body of the doll and a rubber band has been engaged over the several hooks to hold the parts in assembled relation and to permit articulation at the joints.

The general purpose of the present invention is to provide a simple, inexpensive connector for the purpose, eliminating all metal parts and eliminating the rubber or elastic band heretofore used for holding the doll parts in assembled relation.

A further purpose of the invention is to provide an improved connector for the "wetting" type of doll.

The foregoing and other purposes of the invention are attained in the doll construction illustrated in the accompanying drawing and described below. It is to be understood that the invention is not limited to the specific form thereof shown and described.

Of the accompanying drawing:

Figure 1 is a front elevation partly in section of a doll embodying the invention.

Figure 2 is an elevation of the improved connector.

Referring to the drawing, the numeral 10 designates the torso, 11 the head, 12, 12 the arms, and 13, 13 the legs of a hollow rubber doll of known construction. The torso 10 is formed at the neck with a male joint member 14 for a socket joint, seating in a correspondingly formed socket 15 in the bottom of the head whereby the head may have universal articulation upon the torso.

The torso 10 also is formed with arm sockets 16, 16 receiving male socket joint members 17, 17 on the inner ends of the arms and with leg sockets 18, 18 receiving male socket members 19, 19 on the top ends of the legs.

The socket joint member 14 at the neck is formed with an aperture 20 and its socket 15 with an aligned aperture 21. Each arm socket is formed with an aperture 22 and the male socket-joint members of the arms, each with an aligned aperture 23. Each set of a leg socket and a male socket-joint members is similarly formed with aligned apertures 24 and 25.

In accordance with the present invention a connector, as shown in Figure 2, is provided for securing the doll parts together, as shown in Figure 1. This connector is preferably a single unitary structure of flexible elastic material such as vulcanized rubber formed to the shape shown. This connector is preferably formed with a neck-joint member 26, arm-joint members 27, 27, and leg-joint members 28, 28. The neck-joint member 26 is formed on the top end of a rod 29 from which extend arms 30, 30, on the outer ends of which, members 27 are formed, the rod 29, at its bottom preferably having an inverted Y formation 31 on the lower ends of which are formed members 28.

The neck-joint member 26 is formed with a lower enlarged flange formation 26a received inside of the male socket joint member 14 by insertion through its aperture 20, as shown in Figure 1, which is stretched and deformed to permit insertion. Member 26 is also formed with an enlarged hooking flange 26b which is inserted in a similar way through aperture 21 of the head to the position shown in Figure 1.

The arm joint members 27 are of such size and shape as to fit in the arms 12 as shown in Figure 1 and each has thereon a hooking flange 27a for engaging in back of a hooking flange 27b on the inside of the male socket joint member of each arm.

The leg joint members 28 are similarly formed and have similar hooking flanges 28a thereon engaging in back of similar hooking flanges 30 in the leg, male socket-joint members.

The connector, as shown in Figure 2, is preferably made originally of such size and of flexible elastic material whereby in order to engage the several joint members thereof in the doll joints, the connector will be stretched to some extent and placed under tension thus tightly holding the doll assembled. Thus rod 29 between the head and leg joints and arms 30 is under more or less tension.

It will be understood that the improved connector is first placed inside the torso 10 by insertion through the neck opening with the neck-joint member 26 projecting from the neck as will be understood, the connector being flexed and the neck opening deformed and stretched as required for this purpose. The arm and leg joint members 27 and 28 are then engaged in the arm and leg sockets of the torso. The head, arms and legs are then snapped into place over the various joint members, the torso being flexed and deformed as required to facilitate this operation.

When the improved connector is used in the

"nursing and wetting" type of doll, a tube 33 connected to the inside of the doll mouth 32 may be extended through an aperture in joint member 26 into the torso and the improved connector including joint members 26, 27 and 28 effectively seals the torso against leakage excepting at the usual aperture (not shown) provided in this type of doll.

Modifications of the invention may be resorted to without departing from the spirit thereof or the scope of the appended claim.

What is claimed is:

A doll construction comprising a hollow torso, opposite hollow arms at the sides of the torso and opposite hollow head and hollow leg members at the top and bottom of the torso, and a single unitary flexible elastic connector in said torso, said torso and said arms, head and legs having socket joints with openings therethrough, said joints permitting articulation of the head, arms and legs on the torso, and said leg joints being in oppositely downwardly diverging relation, said connector comprising one tension member extending from the head to the legs and through the openings in the socket joints of said head and legs and the lower end of said tension member being formed with diverging elements extending to the legs in Y formation, said tension member having enlarged ends engaged in the head and legs, and said connector comprising another tension member extending between said arms and through the openings in the socket joints of the arms and having enlarged ends engaged in the arms, said connector being insertable into the torso through the head opening, all the members of said connector being separate from the articulating parts and under tension between opposed articulating joints of the doll construction, the tension members between the arms and between the head and legs crossing each other inside the torso at an integral joint.

MELVIN S. LOWER.